April 25, 1950 R. F. BREWER 2,505,092
BABY BOTTLE TEMPERATURE RETAINER
Filed Sept. 8, 1948
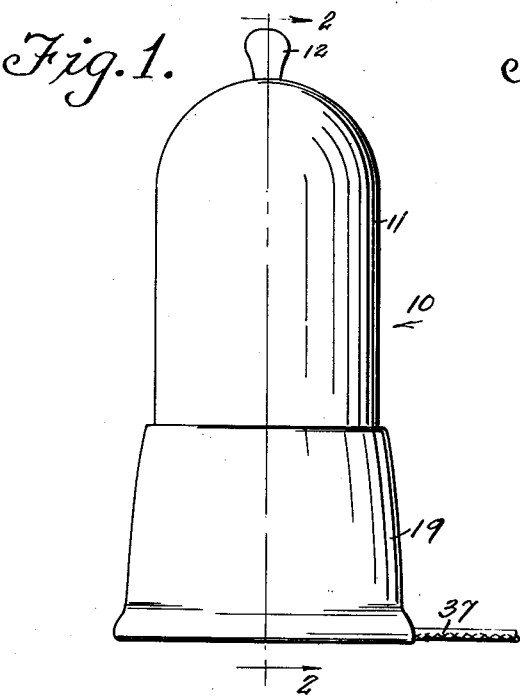
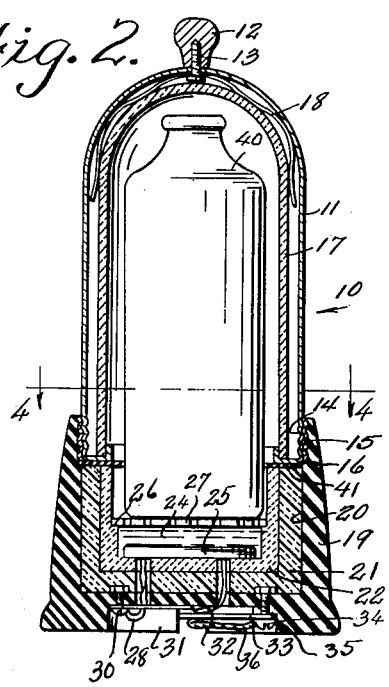
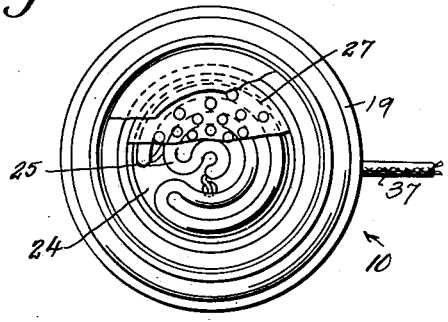
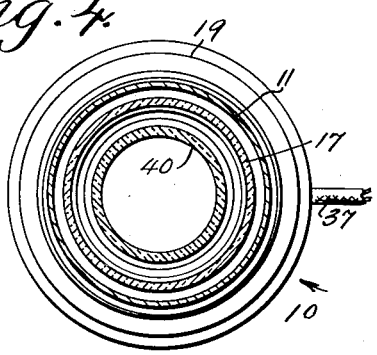
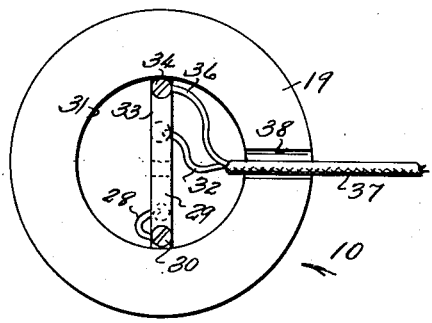
INVENTOR.
Robert F. Brewer
BY Victor J. Evans & Co.
ATTORNEYS Patented Apr. 25, 1950

2,505,092

UNITED STATES PATENT OFFICE 2,505,092

BABY BOTTLE TEMPERATURE RETAINER

Robert F. Brewer, Waynesburg, Pa.

Application September 8, 1948, Serial No. 48,285

4 Claims. (Cl. 219—43)

This invention relates to a device for maintaining the temperature of a baby's milk bottle for a period of time, which device is also provided with means for heating the bottle, when desired.

An object of the invention is to provide a temperature maintaining device for milk bottles for babies, that will protect the contents of the bottle from spoiling and will, when desired, heat the contents to a proper temperature for feeding purposes.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention;

Figure 2 is a vertical, sectional view on the line 2—2 of Figure 1;

Figure 3 is a top plan view of the heating element;

Figure 4 is a cross-sectional view on the line 4—4 of Figure 2 and

Figure 5 is a bottom plan view of the heating element showing the thermostatic controlling switch.

Referring more in detail to the drawing, the device embodying the invention is generally designated by the reference numeral 10.

It is shown to comprise a metal dome shaped protecting covering 11, having a knob 12 fixed to the summit by means of a fastener 13. The bottom edge of the covering is provided with threads 14, which engage with the threaded ring 15. The bottom edge of the threaded portion of the covering 11 is provided with the inturned channel shaped lip or flange 16. The flange 16 receives the lower open edge of the dome shaped insulating container 17, so that the container is retained in the covering. A curved pressure spring 18 carried by the fastener 13 engages the summit of the container 17 to prevent its rattling or breakage within the covering 11.

To complete the embodiment of the invention, a bowl-like base 19 is made of plastic or ceramic or similar materials, is provided, having a central circular recess 20, at the upper edge of which is fixed the threaded ring 15. The base 19 has a cup-shaped member 21 having insulating qualities sealed in the recess 20. Positioned in the member 21 is a cup-shaped member 22, which is made of ceramic or similar materials. A recess 24 is formed in its bottom surface to receive the heating element or coil 25. Upstanding legs may be formed at the bottom of the recess to position and retain the element in the recess. The recess 24 forms an annular shoulder 26 in the member 21, which is adapted to support the ceramic perforated disc 27. The element or coil 25 is of the immersion type, so that when water is placed in the recess 24, steam created by the heating of the water will rise up into the container 17. The coil, at one end, is connected by a wire 28 to the fixed element 29 of a thermostatic switch fixed at 30 to the base within the central recess 31 in the bottom of the base 19. The coil, at the opposite end, is connected to the source of current, not shown, by a wire 32. The movable element 33 of the thermostatic switch is fixed at one end at 34 to the projection 35 on the base 19, within the recess 31, and the element 33 of the switch is also connected to the source of current by the wire 36.

The wires 32 and 36 respectively comprise the double wire cable 37, as shown in the figures—more especially Figure 5—which pass through the cutout 38 formed in the base 19.

In use, a baby's milk bottle 40, after it has been cooled, is placed on the disc 27, within the cup-like member 22. Then the covering 11, carrying the insulating container 17, threadedly engages with the ring 15. A gasket 41 resting on the top edge of the members 21 and 22 prevents damage to these members, and also seals the contact thus made. The insulated container 17, due to its insulated properties, will retain the contents of the bottle in a cooled condition for several hours. Should it be desired to heat the contents of the bottle 40, the thermostat switch is actuated, and the current is conducted to the heating element 23 to heat the contents of the bottle and the current will be cut off at the proper time by the switch.

While the switch has been shown to be positioned in the base 19, it can be located on the side of the base or on the covering 11, and properly insulated therefrom, if desired. It is also possible to place the heating element within the covering 11.

The device thus described will both heat and maintain the contents in an unspoiled condition until used.

The device eliminates the midnight trip to the ice box to get the bottle of milk, and also furnishes means for the heating of the milk.

The insulating material of the container 17 and the insulating qualities of the base prevent atmospheric heat from contacting the bottle to spoil the contents thereof. The deep well formed by the member 21 also prevents the bottle from tipping over while it is being handled.

The use of water vapor or steam in heating the bottles prevents hot spots in the heating element and insures more uniform heating of the bottle. The rubber gasket seals all atmospheric heat out of the device for the spoilage of the contents of the bottle.

It is believed that from the foregoing description, the structure and use of the device will be apparent to those skilled in the art. It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described, comprising a bowl-like base, a heating element in said base, a cover receivable in said base and adapted to provide a heating chamber for said heating element, an inturned channel shaped lip on the lower end of said cover a temperature maintaining insulating container carried by the inturned channel shaped lip on said cover and receivable at its lower end in the lip on said cover, said cover adapted to maintain the temperature of the contents of a bottle placed on said heating coil prior to the heating of the contents of the bottle.

2. The invention as in claim 1, wherein said cover and said bottle are dome shaped and means is provided on said cover for retaining said container in said cover in spaced relation thereto.

3. A device of the character described, comprising a base made of an insulating material, a cover, an inturned channel shaped lip on the lower end of said cover, a container having insulating properties carried by the lip on the cover and said cover being receivable in said base, said cover adapted to maintain the temperature of the contents of a bottle placed on said base.

4. The invention as in claim 3, wherein said base is provided with a threaded ring and the cover is provided with a threaded lower edge upwardly of the lip thereon whereby said cover is connected to said base, and a gasket is interposed between the lip on the cover and the base to seal the connection from outside atmospheric heat.

ROBERT F. BREWER.

REFERENCES CITED

The following references are of record in the file of this patent:

UNITED STATES PATENTS

| Number | Name | Date |
|---|---|---|
| 1,860,302 | Thomas | May 24, 1932 |
| 2,277,605 | Palitzsch | Mar. 24, 1942 |
| 2,413,176 | Deaton | Dec. 24, 1946 |